(12) United States Patent
Yasokawa (10) Patent No.: US 11,422,353 B2
(45) Date of Patent: Aug. 23, 2022

(54) LIQUID SUPPLIER, OBJECTIVE LENS HOLDER, MICROSCOPE, AND LIQUID SUPPLY METHOD

(71) Applicant: NIKON CORPORATION, Tokyo (JP)

(72) Inventor: Toshiki Yasokawa, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 385 days.

(21) Appl. No.: 16/588,134

(22) Filed: Sep. 30, 2019

(65) Prior Publication Data

US 2020/0026054 A1 Jan. 23, 2020

Related U.S. Application Data

(63) Continuation of application No. PCT/JP2018/013989, filed on Mar. 30, 2018.

(30) Foreign Application Priority Data

Mar. 31, 2017 (JP) .............................. JP2017-069986

(51) Int. Cl.
*G02B 21/33* (2006.01)
*G01N 21/64* (2006.01)
(Continued)

(52) U.S. Cl.
CPC ......... *G02B 21/33* (2013.01); *G01N 21/6458* (2013.01); *G02B 21/16* (2013.01);
(Continued)

(58) Field of Classification Search
CPC ...... G02B 21/33; G02B 21/16; G02B 21/244; G02B 21/248; G02B 21/0088; G02B 21/365; G01N 21/6458; G01N 2021/6478
See application file for complete search history.

(56) References Cited

U.S. PATENT DOCUMENTS

2006/0021569 A1 2/2006 Petrillo et al.
2006/0238885 A1* 10/2006 Hasegawa .............. G02B 21/33
359/657
(Continued)

FOREIGN PATENT DOCUMENTS

DE 20 2017 000 475 U1 2/2017
JP 2006-308676 A 11/2006
(Continued)

OTHER PUBLICATIONS

Apr. 21, 2020 Office Action issued in Japanese Patent Application No. 2019-509433.
(Continued)

*Primary Examiner* — Mustak Choudhury
(74) *Attorney, Agent, or Firm* — Oliff PLC (57) ABSTRACT

A liquid supplier includes: a supply port which supplies a liquid to a space between an objective lens and an observation object; and a recovery port which recovers the liquid supplied from the supply port, wherein the supply port and the recovery port satisfy a condition where positions of the supply port and the recovery port differ from each other in a direction of an optical axis of the objective lens or a condition where positions of the supply port and the recovery port with respect to the optical axis differ from each other in a direction perpendicular to the optical axis of the objective lens or both conditions.

18 Claims, 9 Drawing Sheets

(51) Int. Cl.
    *G02B 21/16*     (2006.01)
    *G02B 21/24*     (2006.01)

(52) U.S. Cl.
    CPC ......... *G02B 21/244* (2013.01); *G02B 21/248* (2013.01); *G01N 2021/6478* (2013.01)

(56) References Cited

U.S. PATENT DOCUMENTS

| | | | |
|---|---|---|---|
| 2008/0170292 A1* | 7/2008 | Harada | G02B 21/33 359/391 |
| 2008/0259446 A1 | 10/2008 | Komatsu et al. | |
| 2015/0212310 A1 | 7/2015 | Fukuda et al. | |

FOREIGN PATENT DOCUMENTS

| | | |
|---|---|---|
| JP | 2008-170867 A | 7/2008 |
| JP | 2015-227940 A | 12/2015 |

OTHER PUBLICATIONS

Jul. 3, 2018 International Search Report issued in International Patent Application No. PCT/JP2018/013989.
Oct. 1, 2019 International Preliminary Report on Patentability issued in International Patent Application No. PCT/JP2018/013989.
Feb. 16, 2021 Search Report issued in European Patent Application No. 18777323.9.
Nov. 13, 2020 Partial Supplementary European Search Report issued in European Patent Application No. 18777323.9.
Dec. 8, 2020 Office Action issued in Japanese Patent Application No. 2019-509433.

* cited by examiner

LIQUID SUPPLIER, OBJECTIVE LENS HOLDER, MICROSCOPE, AND LIQUID SUPPLY METHOD

CROSS REFERENCE TO RELATED APPLICATION

This is a Continuation of PCT Application No. PCT/JP2018/013989, filed on Mar. 30, 2018. The contents of the above-mentioned application are incorporated herein by reference.

FIELD OF THE INVENTION

The present invention relates to a liquid supplier, an objective lens holder, a microscope, and a liquid supply method.

BACKGROUND

In the field of microscopes, it is known to perform an observation while a space between a cover glass or a culture vessel having an observation object (for example, living cells) placed thereon and an objective lens is filled with a liquid (an immersion liquid, a liquid immersion medium) (refer to U.S. Patent Application Publication No. 2015/0212310 A1, for example).

SUMMARY

A first aspect of the present invention provides a liquid supplier comprising: a supply port which supplies a liquid to a space between an objective lens and an observation object; and a recovery port which recovers the liquid supplied from the supply port, wherein the supply port and the recovery port satisfy a condition where positions of the supply port and the recovery port differ from each other in a direction of an optical axis of the objective lens or a condition where positions of the supply port and the recovery port with respect to the optical axis differ from each other in a direction perpendicular to the optical axis of the objective lens or both conditions.

A second aspect of the present invention provides an objective lens holder which includes the liquid supplier according to the first aspect, and which holds and positions the objective lens.

A third aspect of the present invention provides a microscope comprising: the objective lens holder according to the second aspect; and an objective lens.

A fourth aspect of the present invention provides a liquid supply method comprising: supplying a liquid from a supply port to a space between an objective lens and an observation object; and recovering from a recovery port the liquid supplied from the supply port; and arranging the supply port and the recovery port so as to satisfy a condition where positions of the supply port and the recovery port differ from each other in a direction of an optical axis of the objective lens or a condition where positions of the supply port and the recovery port with respect to the optical axis differ from each other in a direction perpendicular to the optical axis of the objective lens or both conditions.

DETAILED DESCRIPTION OF EMBODIMENTS

First Embodiment

Figure 1:
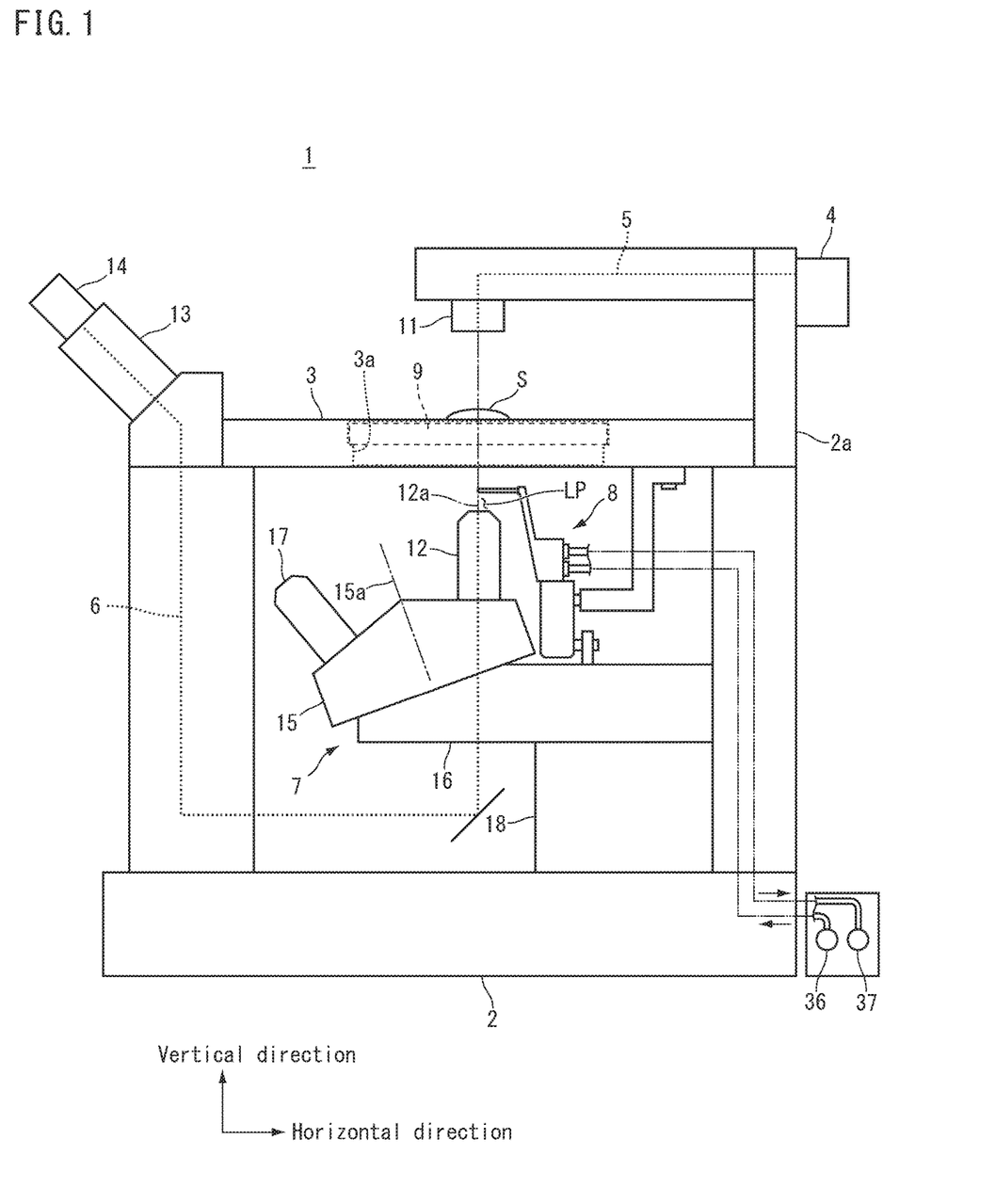
FIG. 1 is a diagram showing a microscope according to a first embodiment.

Hereunder, a first embodiment will be described. FIG. 1 is a diagram showing a microscope according to the present embodiment. A microscope 1 of FIG. 1 is an inverted microscope. However, the microscope of the embodiment may also be applied to an upright microscope. A microscope includes a base 2, a stage 3, a light source 4, an illumination optical system 5, an observation optical system 6, a revolver 7 (an objective lens holder), and a liquid supplier 8. The base 2 is placed on an installation surface such as an upper surface of a desk and supports each part of the microscope 1. The stage 3 is supported by a strut 2a erected on the base 2 and supports a specimen S (observation object). An opening 3a is provided on the stage 3, and a specimen holder 9 (for example, a glass slide) which holds the specimen S is fitted into the opening 3a. Alternatively, a culture vessel is placed on the stage 3.

The light source 4 includes, for example, a solid light source such as a light emitting diode (LED) or a laser diode (LD), or a lamp light source, and emits illumination light. The illumination optical system 5 irradiates the specimen S on the stage 3 with the illumination light from the light source 4 via an irradiator 11 having a condenser lens (not shown in the drawings). In the example of FIG. 1, the illumination optical system 5 is a transilluminator which irradiates the specimen S with the illumination light from the side opposite to the objective lens 12 with respect to the specimen S. The illumination optical system 5 may be an epi-illuminator which epi-illuminates the specimen S. In such a case, the illumination optical system 5 irradiates the specimen S with the illumination light via the objective lens 12. The microscope 1 may include both the transilluminator and the epi-illuminator mentioned above.

In the microscope 1, for example, the illumination optical system 5 is arranged above the specimen S (the stage 3). The illumination optical system 5 is supported by, for example, a columnar part on a rear side (on the right side in FIG. 1) of the base 2. The microscope 1 need not include the light source 4. For example, the light source 4 may be such that an illumination light introducer including a fiber is attached as an external device to the microscope 1.

The observation optical system 6 includes an objective lens 12. A part of the observation optical system 6 is held by a lens barrel 13. An eyepiece lens 14 is attached to the lens barrel 13, and an observer can observe the image of the specimen S formed by the observation optical system 6 through the eyepiece lens 14. The microscope 1 can image-capture the image of the specimen S formed by the observation optical system 6 by means of an image-capturing element (not shown in the drawings), and the observer can perform observation using an image acquired by the image-capturing element. The microscope 1 only needs to be capable of at least one of either observation through the eyepiece lens 14 or observation using a captured image.

The microscope 1 is used to perform observation (for example, for bright field observation), for example, by forming an image with light scattered by the specimen S, among the illumination light irradiated onto the specimen S from the illumination optical system 5, for example. In FIG. 1, the microscope 1 irradiates illumination light from above the specimen S, and uses the light transmitted and scattered by the specimen S for observation. The microscope 1 may use oblique illumination or may use light reflected and scattered by the specimen S for observation. The microscope 1 may also be used for fluorescence observation. When performing fluorescence observation, excitation light which excites a fluorescent substance contained in the specimen S, and fluorescence emitted from the fluorescent substance is used to perform observation. A luminescent probe may be added to the specimen S, and the microscope 1 may be used to perform observation of cells which emit light by means of the luminescent probe.

The revolver 7 holds the objective lens 12 and is used to position the objective lens 12. The revolver 7 includes a movable part 15 which is movable (rotatable) while holding the objective lens 12, and a fixing part 16 which supports the movable part 15. The movable part 15 can hold an objective lens 17 in addition to the objective lens 12. The objective lens 17 differs from the objective lens 12 in terms of magnification and focal length, for example. The movable part 15 is rotatable with respect to the fixing part 16 about a rotation axis 15a. In the present embodiment, the revolver 7 capable of rotating motion is shown as an example. However, the objective lens 12 may be held by a slider capable of linear motion.

The movable part 15 is capable of switching between a state where the objective lens 12 is arranged on a light path LP of the light from the specimen S and a state where the objective lens 17 is arranged on the light path LP, for example, by rotating about the rotation axis 15a while holding the objective lens 12 and the objective lens 17. The objective lens 12 is attached to the movable part 15 so that the optical axis 12a of the objective lens 12 is parallel to the vertical direction in the state of being arranged on the light path LP. The rotation axis 15a of the movable part 15 is set, for example, in a direction inclined from (not parallel with and not perpendicular to) the vertical direction. The rotation axis 15a of the movable part 15 is inclined from the optical axis 12a of the objective lens 12.

In the inverted microscope of FIG. 1, the revolver 7 can be moved in a direction parallel to the optical axis 12a of the objective lens 12. For example, in the state where the objective lens 12 is arranged on the light path LP, the optical axis 12a is parallel to the vertical direction, and the revolver 7 including the objective lens 12 can move in the vertical direction with respect to the stage 3, which supports the specimen S. The stage 3 may also be movable in the vertical direction, and the revolver 7 including the objective lens 12 and the stage 3 may each be movable in the vertical direction.

In FIG. 1, the objective lens 12 moves as the revolver 7 is moved in the vertical direction by a lifter 18 (vertical mover). The lifter 18 is provided at the bottom of the base 2 and supports the fixing part 16 of the revolver 7. The lifter 18 moves the movable part 15 supported on the fixing part 16 and the objective lens 12 attached to the movable part 15 in the vertical direction by moving the fixing part 16 in the vertical direction. For example, the lifter 18 moves the objective lens 12 upward by moving the fixing part 16 upward to cause the objective lens 12 to approach the specimen S (the stage 3). The lifter 18 may be one which moves the fixing part 16 by a driving force from a motor, an actuator, or the like, or may be one which moves the fixing part 16 by an observer operating an operation knob to transmit human power.

The microscope 1 is a liquid immersion microscope capable of performing liquid immersion observation, and the liquid supplier 8 can supply a liquid (an immersion liquid, a liquid immersion medium) to the space between the objective lens 12 and the specimen S. As such a liquid, water, oil, and so forth are used, for example. The liquid supplier 8 is provided on the revolver 7, for example. However, the liquid supplier 8 may be provided in a portion separate from the revolver 7 and can be used for a microscope which does not include the revolver 7.

When performing liquid immersion observation, it is, in general, desirable that an appropriate amount of liquid is held between the glass slide or the bottom of the culture vessel on which the specimen is held (the specimen holder), and the objective lens. Here, when a desired objective lens is selected from a plurality of objective lenses having different focal lengths, the clearance (working distance) between an optical member (a front lens) closest to the specimen in the objective lens and the glass slide varies, depending on the type of objective lens. Therefore, the liquid supplier 8 according to the embodiment is made capable of accurately adjusting the amount of liquid supplied to the space between the specimen holder and the objective lens 12. Hereunder, the liquid supplier 8 will be described in detail.

Figure 2A:
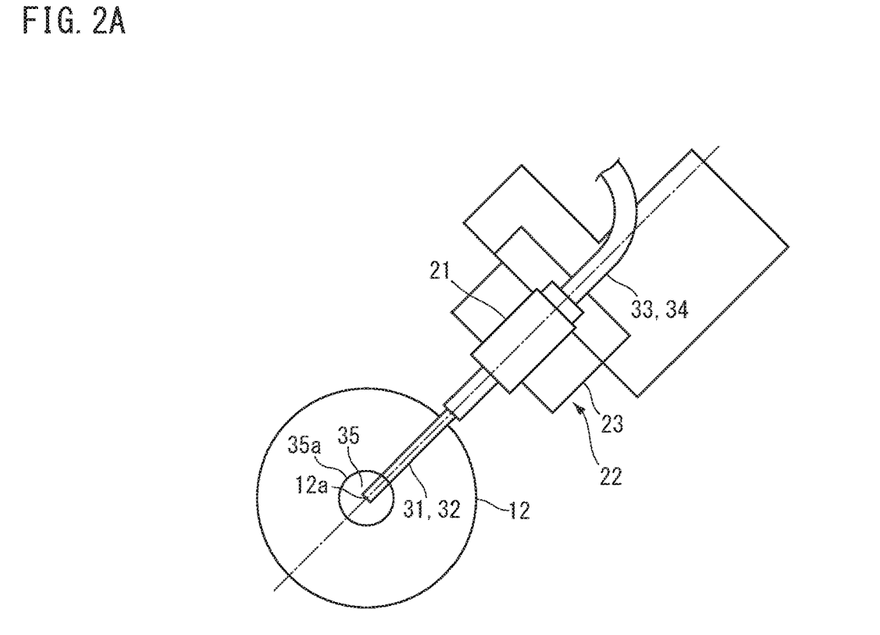
FIGS. 2A and 2B are diagrams showing a liquid supplier according to the first embodiment.
Figure 2B:
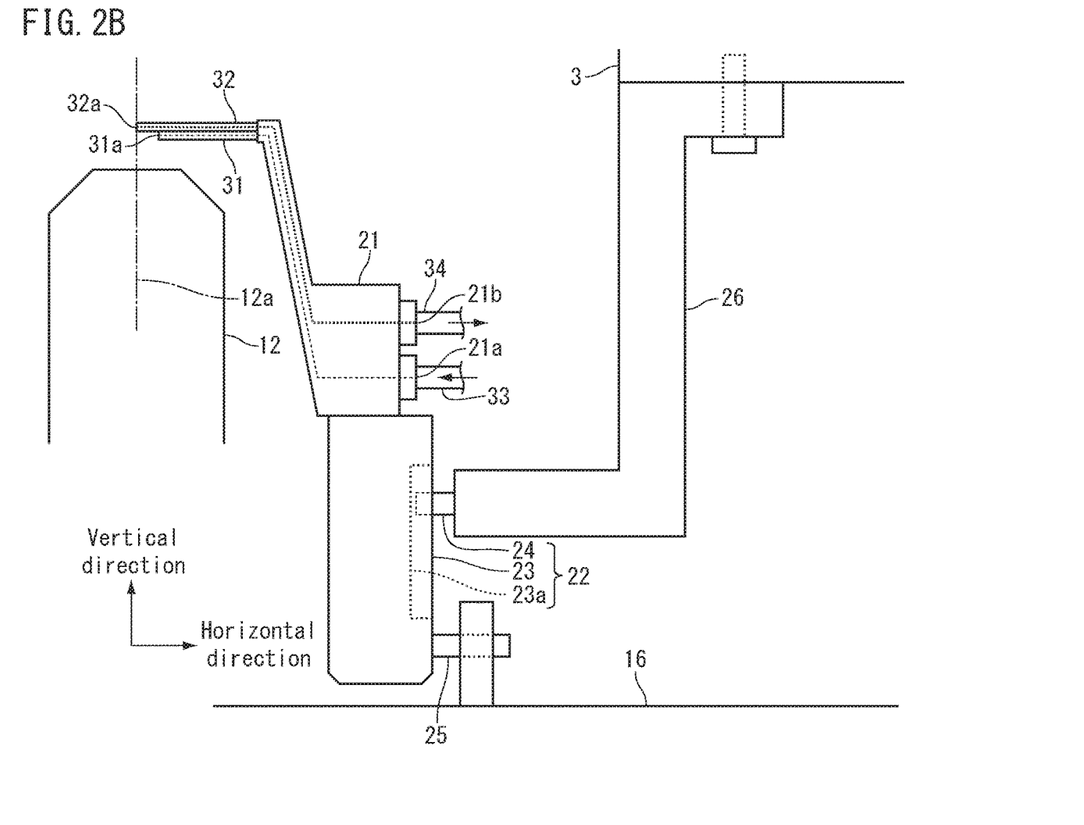

FIG. 2A is a plan view of the liquid supplier 8 as viewed from above, and FIG. 2B is a side view of the liquid supplier 8 as viewed from a side. The liquid supplier 8 includes a supply port 31a and a recovery port 32a. The supply port 31a supplies a liquid to a space between the objective lens 12 and the observation object (the specimen S in FIG. 1). The recovery port 32a recovers the liquid supplied from the supply port 31a. The supply port 31a and the recovery port 32a satisfy a condition where positions of the supply port 31a and the recovery port 32a differ from each other in the direction of the optical axis of the objective lens 12 (the direction parallel to the optical axis 12a) or a condition where positions of the supply port 31a and the recovery port 32a with respect to the optical axis 12a differ from each other in the direction perpendicular to the optical axis 12a of the objective lens 12 or both conditions.

In FIG. 2B, the supply port 31a and the recovery port 32a satisfy the condition where the positions thereof differ from each other in the optical axis direction of the objective lens 12. At least a part of the recovery port 32a is arranged at a position different from that of the supply port 31a in the optical axis direction of the objective lens 12. In FIG. 2B, at least a part of the recovery port 32a is arranged above the supply port 31a. The positions of the supply port 31a and the recovery port 32a according to the embodiment will also be described later with reference to FIGS. 5A and 5B to FIGS. 7A to 7C.

The liquid supplier 8 includes a nozzle unit 21 and an inserter/remover 22 as shown in FIG. 2B.

The inserter/remover 22 includes a cam 23 and a cam follower 24. The cam 23 is provided on a supporter which supports the objective lens 12 (the fixing part 16 of the revolver 7). A stay 26 including the cam follower 24 is provided on a surface on the objective lens side of the stage 3 which supports the observation object (the specimen S). The cam 23 is fixed so as not to move relative to the fixing part 16 of the revolver 7 in the vertical direction. A rotation shaft 25 is fixed to the cam 23, and the rotation shaft 25 is rotatably supported by the fixing part 16. The cam 23 is rotatable with respect to the fixing part 16 about the rotation shaft 25. The rotation shaft 25 extends, for example, in parallel with the horizontal direction, and the cam 23 is supported so as not to move in a direction perpendicular to the rotation shaft 25 with respect to the fixing part 16.

The cam 23 has a cam groove 23a, and the cam follower 24 (pin) is fitted to an inner wall of the cam groove 23a. The inner wall of the cam groove 23a is in contact with an outer wall of the cam follower 24 (the pin). The cam follower 24 is attached to a stay 26, and the stay 26 is fixed to the stage 3. The cam follower 24 is fixed so as not to move with respect to the stage 3. Therefore, the supply port 31a and the recovery port 32a in the direction of the optical axis 12a can be positioned at fixed positions from a mount (mounting plane) of the objective lens 12 in the movable part 15.

The nozzle unit 21 is attached on the cam 23 and integrated with the cam 23. The nozzle unit 21 includes a supply member 31 having the supply port 31a and a recovery member 32 having the recovery port 32a. An inflow port 21a and an outflow port 21b are provided in the nozzle unit 21. The inflow port 21a is connected to a liquid feeder 36 (see FIG. 1) via a pipe 33. The outflow port 21b is connected to sucker 37 (see FIG. 1) via a pipe 34. In the nozzle unit 21, an internal flow path (a pipe line) connecting the inflow port 21a and the supply port 31a and an internal flow path (a pipe line) connecting the outflow port 21b and the recovery port 32a are provided.

The supply port 31a supplies the liquid to the light path LP above the objective lens 12. The supply port 31a is arranged, for example, on the inner side in the horizontal direction with respect to an outer circumference 35a of a portion 35 (shown in FIG. 2A) exposed to the outside from the lens barrel of the objective lens 12, among the optical member (for example, the front lens) closest to the specimen S in the objective lens 12. The supply port 31a may be arranged at a position on a distal end face of the lens barrel of the objective lens 12 in the horizontal direction. In such a case, for example, a liquid-repellent region may be provided on a part of the distal end face of the lens barrel of the objective lens 12, and the liquid may be held inside this region.

The recovery port 32a is arranged above the supply port 31a and recovers the liquid from the light path LP above the objective lens 12. The recovery port 32a is arranged at a position different from that of the supply port 31a in the radial direction with respect to the optical axis 12a of the objective lens 12. The distance from the recovery port 32a to the optical axis 12a of the objective lens 12 is set shorter than the distance from the supply port 31a to the optical axis 12a of the objective lens 12. For example, the supply port 32a is arranged at substantially the same position as that of the optical axis of the objective lens 12 in the horizontal direction. The supply port 31a is arranged on the outer side of the recovery port 32a in the radial direction with respect to the optical axis 12a of the objective lens 12.

As shown in FIG. 2A, the supply member 31 and the recovery member 32 each extend linearly in the horizontal direction, and the supply member 31 and the recovery member 32 are arranged in an overlapped manner in the direction of the optical axis 12a of the objective lens 12. Here, the supply member 31 and the recovery member 32 are integrated. The supply member 31 and the recovery member 32 are not limited to the configuration described above and may be changed as appropriate. Modified examples of the supply member 31 and the recovery member 32 will be described with reference to FIGS. 9A to 9C and so forth.

Figure 3A:
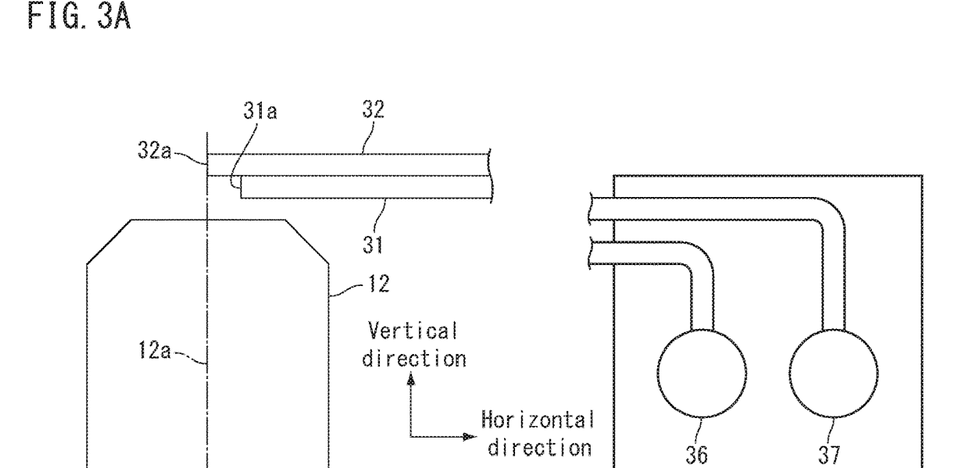
FIGS. 3A to 3C are diagrams showing an operation of the liquid supplier according to the first embodiment.
Figure 3B:
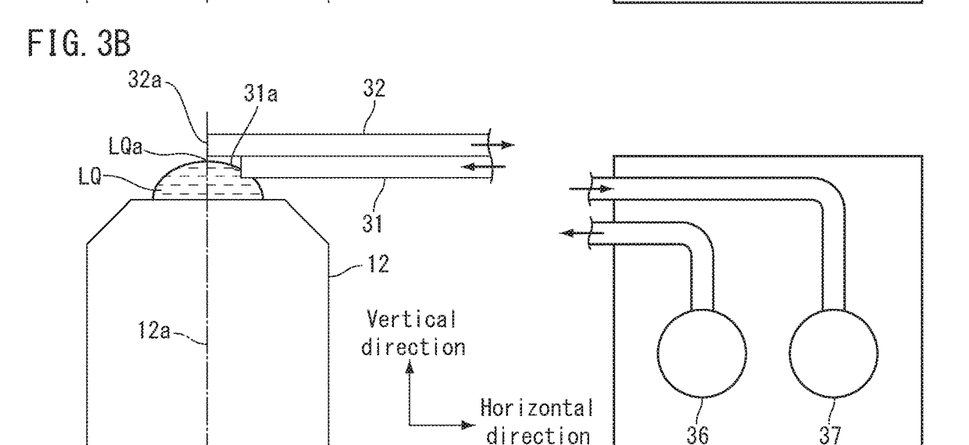
Figure 3C:
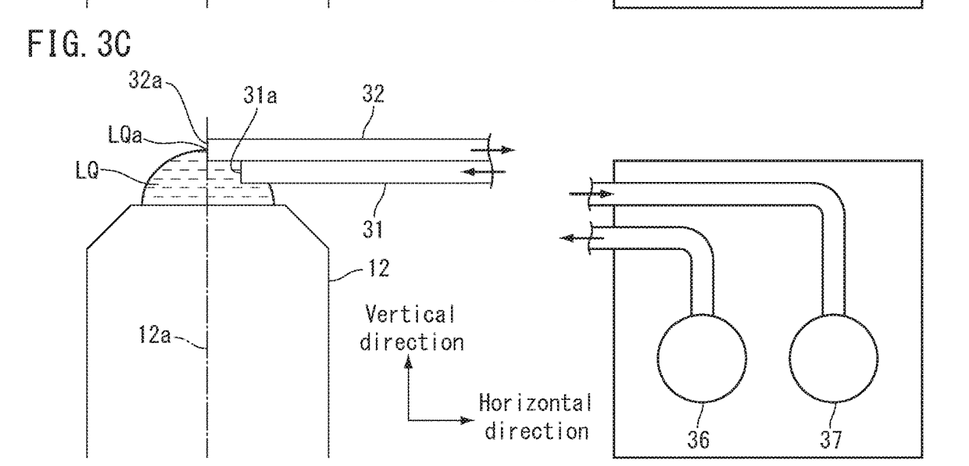

Here, a liquid supply method according to the embodiment will be described, on the basis of the configuration of the liquid supplier 8. FIGS. 3A to 3C are diagrams showing liquid supply and liquid recovery operations of the liquid supplier according to the present embodiment. As shown in FIG. 3A, the supply member 31 and the recovery member 32 are positioned with respect to the objective lens 12 in a state where supply of the liquid from the liquid feeder 36 (the supply pump) is stopped. In the state of FIG. 3A, the supply port 31a and the recovery port 32a are arranged so as to satisfy a condition where the positions of the supply port 31a and the recovery port 32a differ from each other in the direction of the optical axis of the objective lens 12 or a condition where the positions of the supply port 31a and the recovery port 32a with respect to the optical axis 12a differ from each other in the direction perpendicular to the optical axis 12a of the objective lens 12 or both conditions.

Next, as shown in FIG. 3B, the feeder 36 starts supplying the liquid, and the sucker 37 performs suction in parallel at least with a part of the feeding operation performed by the feeder 36. For example, start and stop of the operation of the feeder 36 and the sucker 37 are switched by the same switch, and both start the operation almost simultaneously. As a result, a liquid LQ is accumulated in a form of a droplet on the objective lens 12, and the height of liquid level LQa increases as the total amount of supplied liquid increases. As shown in FIG. 3B, the supplied liquid forms a hemispherical shape on and fills an area on the upper surface of the objective lens 12.

In the state of FIG. 3B, the upper end of the liquid level LQa is yet to reach the height of the recovery port 32a, and the liquid LQ is hardly recovered (sucked) from the recovery port 32a. In this state, for example, atmospheric gas (for example, air) is recovered from the recovery port 32a. As shown in FIG. 3C, when the upper end of the liquid level LQa reaches the height of the recovery port 32a, the liquid LQ is recovered at the position of the recovery port 32a, and the height of the liquid level LQa is maintained substantially constant. Thereby, a predetermined amount of the liquid LQ is held on the objective lens 12.

That is to say, while the clearance between the distal end of the objective lens 12 and the recovery port 32a defines the liquid level LQa height of the liquid supplied onto the objective lens 12, the length of the lens barrel varies depending on the type of the objective lens 12. Taking this into consideration, the liquid level LQa height of the liquid may be defined on the basis of the mounting plane of the movable part 15, which holds the objective lens, (in the state of being positioned at the observation position). The distal end of the supply port 31a and the distal end of the recovery port 32a are defined according to the defined liquid level height. In the present embodiment, the clearance from the mounting plane of the movable part 15, which holds the objective lens, (in the state of being positioned at the observation position) to the distal end of the supply port 31a is approximately 60 mm.

In the present embodiment, the diameter of the distal end of the supply port 31a and the diameter of the distal end of the recovery port 32a are the same, and the inner diameters thereof are approximately 0.3 mm, and the outer diameters thereof are approximately 0.5 mm. These inner diameters take enabling of smooth suction and supply of liquid into consideration but are not limited to this configuration and may be larger diameters. The diameter of the distal end of the feed supply port 31a and the diameter of the distal end of the recovery port 32a may be different. If a constant liquid supply onto the objective lens 12 is considered, the inner diameter of the recovery port 32a can be made larger than the inner diameter of the supply port 31a.

It is also possible to make the inner diameter of the recovery port 32a smaller than the inner diameter of the supply port 31a. However, when the amount of the liquid supplied onto the objective lens 12 is larger than the amount of the liquid recovered, there is a possibility that an amount of the liquid exceeding a predetermined liquid amount may be supplied onto the objective lens 12. In such a case, it is possible to supply a prescribed amount of liquid onto the objective lens 12 by controlling the amount of the liquid sucked by the sucker 37 and the amount of the liquid fed by the feeder 36. The preferred supply amount of the liquid is between approximately 15 microliters per second and 20 microliters per second inclusive. In order to supply a prescribed amount of the liquid onto the objective lens 12, 15 microliters per second is preferable on the supply side and 20 microliters per second is preferable on the suction side.

Although the amount of the liquid supplied onto the objective lens 12 varies depending on the working distance, it is approximately 10 microliters or more and approximately 100 microliters or less, for example. Although varying depending on the type of the objective lens, the working distance is, for example, between approximately 0.15 mm and approximately 2.00 mm inclusive.

After the liquid LQ on the objective lens 12 reaches the predetermined amount, the supply of the liquid LQ performed by the feeder 36 is stopped and the suction performed by the sucker 37 is stopped. Next, the supply member 31 and the recovery member 32 are retracted from the light path above the objective lens 12 by the inserter/remover 22 (see FIG. 2B). Thereafter, the objective lens 12 and the stage 3 are brought close to each other so that the liquid LQ is sandwiched between the glass slide with the specimen held thereon and the bottom of the culture vessel (the specimen holder).

In the above example, the suction operation at the recovery port 32a starts in conjunction with the liquid supply operation. However, the recovery operation may be performed at or immediately prior to the point in time where the liquid has been supplied and the upper end of the liquid level LQa reaches the height of the recovery port 32a. It is preferable that this control is appropriately performed according to the diameters of the supply port 31a and the recovery port 32a, the supply amount and the recovery amount of the liquid, or the positional relationship between the supply port 31a and the recovery port 32a.

As described above, the liquid supply method according to the embodiment includes: supplying the liquid to the light path LP between the objective lens 12 and the observation object (the specimen S); and recovering the liquid from the light path LP above the position at which the liquid is supplied to the light path (at the supply port 31a).

Figure 4A:
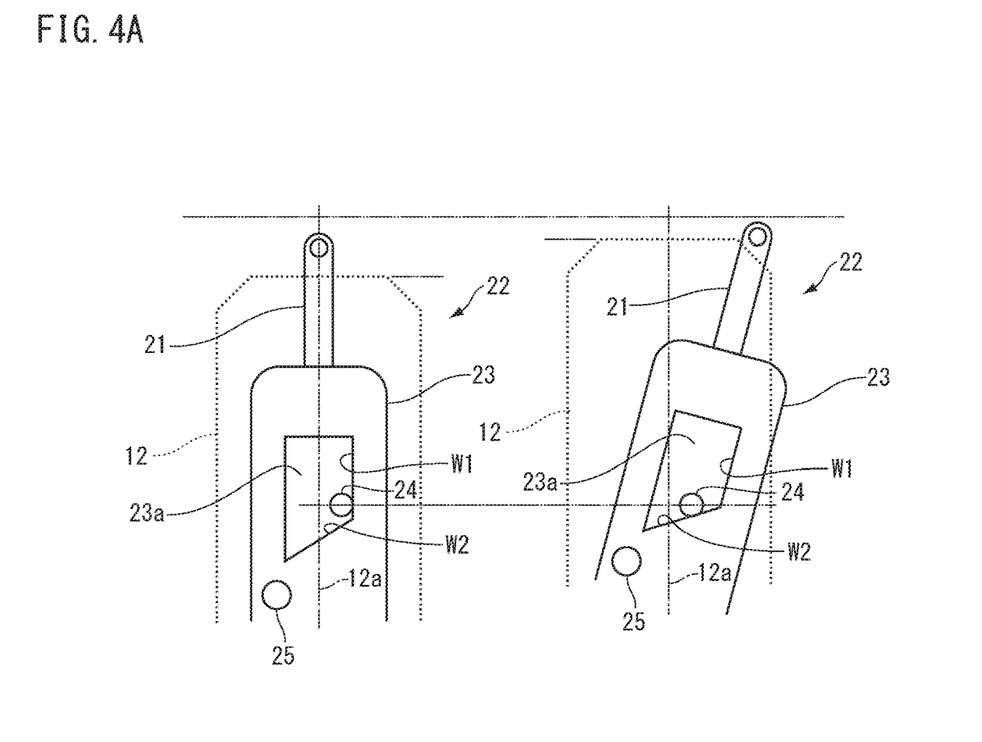
FIGS. 4A and 4B are diagrams showing an inserter/remover according to the first embodiment and an operation thereof.
Figure 4B:
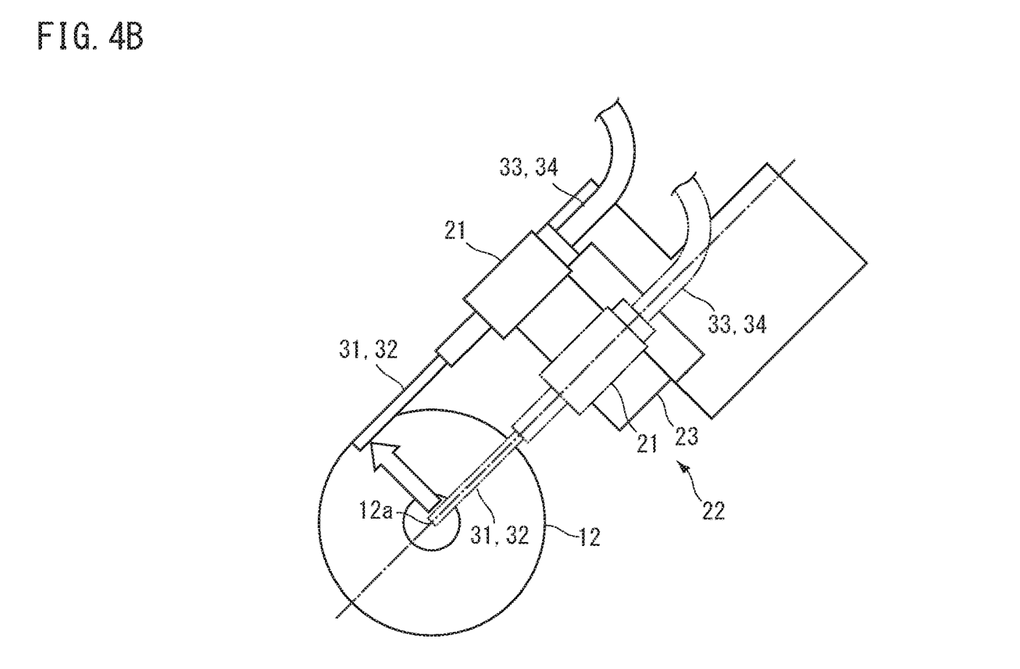

FIGS. 4A and 4B are diagrams showing the inserter/remover according to the present embodiment and an operation thereof. FIG. 4A shows a side view of the inserter/remover 22 as viewed from the side, and FIG. 4B shows a plan view of the nozzle unit 21 as viewed from above in the optical axis direction of the objective lens 12.

The inserter/remover 22 moves the supply member 31 and the recovery member 32 in conjunction with the relative movement of the objective lens 12 with respect to the stage 3 in the optical axis direction. The inner wall of the cam groove 23a in the cam 23 includes a first wall W1 extending linearly and a second wall W2 extending in a direction intersecting with the first wall W1. The cam follower 24 is in contact with an inner wall of the cam groove 23a, and the cam 23 is pressed against the cam follower 24 by a spring or the like so that the inner wall of the cam groove 23a and the cam follower 24 do not separate from each other.

In the left diagram of FIG. 4A, the cam follower 24 is in contact with the first wall W1 of the cam groove 23a of the cam 23. From this state, when the fixing part 16 of the revolver 7 (see FIG. 1) moves upward, the objective lens 12 supported by the fixing part 16 and the cam 23 move upward. On the other hand, the cam follower 24 is supported by the stage 3, and the position thereof in the vertical direction does not change. Therefore, the cam 23 moves upward relatively with respect to the cam follower 24, and the second wall W2 of the cam groove 23a comes in contact with the cam follower 24.

The second wall W2 extends in a direction intersecting with the first wall W1, and upon being pressed downward from the cam follower 24, the second wall W2 receives a horizontal force due to a component force thereof. The cam 23 is rotated about the rotation shaft 25 by this component force, and the nozzle unit 21 is retracted from the light path LP above the objective lens 12 as shown in the right diagram of FIG. 4A and FIG. 4B. As shown in the right diagram of FIG. 4A, the objective lens approaches the stage 3. This state is the position which enables observation.

As the objective lens 12 moves upward, the liquid on the objective lens 12 comes in contact with the lower surface of the specimen holder 9 (see FIG. 1) holding the specimen S, and the space between the objective lens 12 and the specimen holder 9 is filled with the liquid. In this state, the liquid only needs to fill the observation region which includes at least the optical axis 12a of the objective lens 12.

In the above embodiment, the liquid supplier 8 includes: the supply port 31a which supplies the liquid to the light path LP between the objective lens 12 and the observation object; and the recovery port 32a which is arranged above the supply port 31a and which recovers the liquid from the light path LP.

Therefore, as shown in FIGS. 3A to 3C, the height of the liquid level LQa on the objective lens 12 is determined by the position (the height) of the recovery port 32a. As a result, since the amount of the liquid held in the light path LP above the objective lens 12 is adjusted by the position of the recovery port 32a, the amount of the liquid held in the light path LP can be accurately adjusted.

In the above embodiment, the recovery port 32a is arranged at a position different from that of the supply port 31a in the radial direction with respect to the optical axis 12a of the objective lens 12. Therefore, it is possible to suppress the liquid supplied from the supply port 31a from being directly recovered to the recovery port 32a, and for example, the liquid can be efficiently supplied onto the objective lens 12. The recovery port 32a may be arranged at the same position as that of the supply port 31a in the radial direction with respect to the optical axis 12a of the objective lens 12.

In the above embodiment, the distance from the recovery port 32a to the optical axis 12a of the objective lens 12 is set shorter than the distance from the supply port 31a to the optical axis 12a of the objective lens 12. Therefore, the droplet of the liquid on the objective lens 12 can be approximated to a shape rotationally symmetric about the optical axis 12a, and for example, the liquid can be distributed in a rotationally symmetric manner about the center of the visual field. The distance from the recovery port 32a to the optical axis 12a of the objective lens 12 may be set the same as or longer than the distance from the supply port 31a to the optical axis 12a of the objective lens 12.

In the above embodiment, the liquid supplier 8 includes: the supply member 31 having the supply port 31a; the recovery member 32 having the recovery port 32a; and the inserter/remover 22 which inserts or removes the supply member 31 and the recovery member 32 into or from the light path LP. Therefore, it is possible at time of performing observation to suppress the supply member 31 and the recovery member 32 from obstructing the visual field, and to avoid interference (collision) with the objective lens 12.

In the above embodiment, the supply member 31 and the recovery member 32 are arranged in an overlapped manner in the direction of the optical axis 12a of the objective lens 12. Therefore, the installation space (footprint) of the supply member 31 and the recovery member 32 can be reduced, and for example, interference (collision) between the supply member 31 and the recovery member 32, and other members can be avoided.

The supply member 31 and the recovery member 32 may be arranged in a manner that the supply member 31 and the recovery member 32 do not overlap. For example, the positions of the supply member 31 and the recovery member 32 may be shifted in the plane intersecting with the optical axis 12a of the objective lens 12 so that the liquid supplied from the supply port 31a is not directly sucked into the recovery port 32a. However, it is not essential. For example, if the amount of liquid suction performed by the sucker 37 and the amount of liquid feeding performed by the feeder 36 are controlled, the positions of the supply member 31 and the recovery member 32 do not have to be shifted. In the case where the positions of the supply member 31 and the recovery member 32 are shifted, the preferred shift amount in the plane intersecting with the optical axis 12a between the distal end of the supply port 31a and the distal end of the recovery port 32a is between approximately 1 mm and approximately 2 mm inclusive.

In the present embodiment, as shown in FIGS. 3A to 3C, the recovery port 32a is positioned so as to be at a position on the optical axis 12a of the objective lens 12. This is because the shape of the liquid supplied onto the objective lens 12 is hemispherical. That is to say, as shown in FIG. 3B and FIG. 3C, the liquid supplied onto the objective lens 12 forms a hemispheric shape. The liquid level LQa becomes the apex of the hemispherically-shaped liquid and substantially coincides with the optical axis of the objective lens 12. For this reason, recovery of the liquid can be performed at the recovery port 32a arranged at the highest position of the hemispherically-shaped liquid, and a prescribed amount of the liquid can be easily supplied onto the objective lens 12.

The position of the recovery port 32a in the direction perpendicular to the optical axis 12a may be a position coincident with the optical axis 12a as described above or may be a position shifted from the optical axis 12a. When the position is shifted between the recovery port 32a and the optical axis 12a in the vertical direction, the volume of the liquid formed on the objective lens 12 varies depending on the amount of the liquid supplied onto the objective lens 12, and, therefore, the adjustment may be made in consideration of the amount of liquid supplied.

Figure 5A:
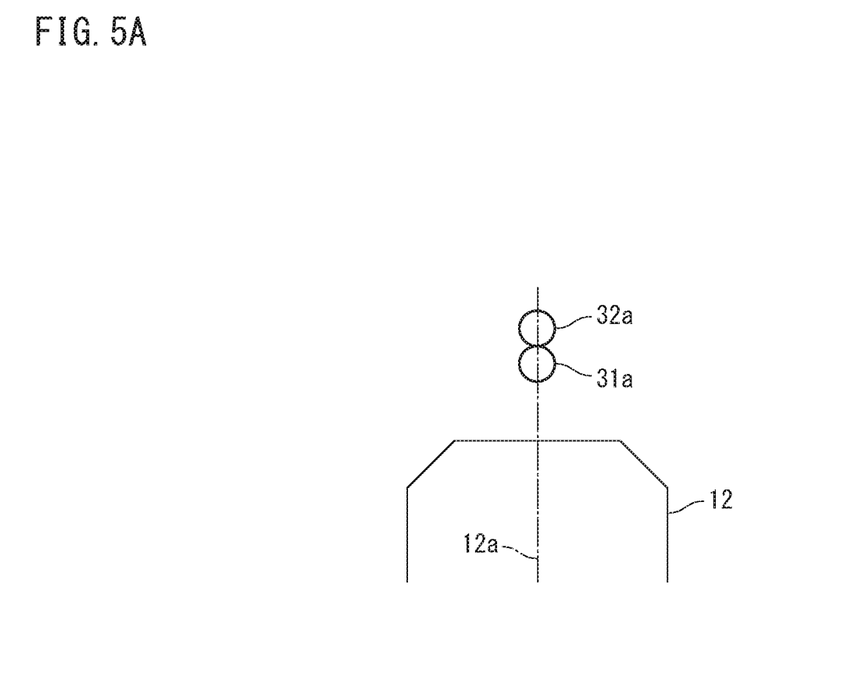
FIGS. 5A and 5B are diagrams showing an example of a positional relationship between a supply port, a recovery port, and an objective lens.
Figure 5B:
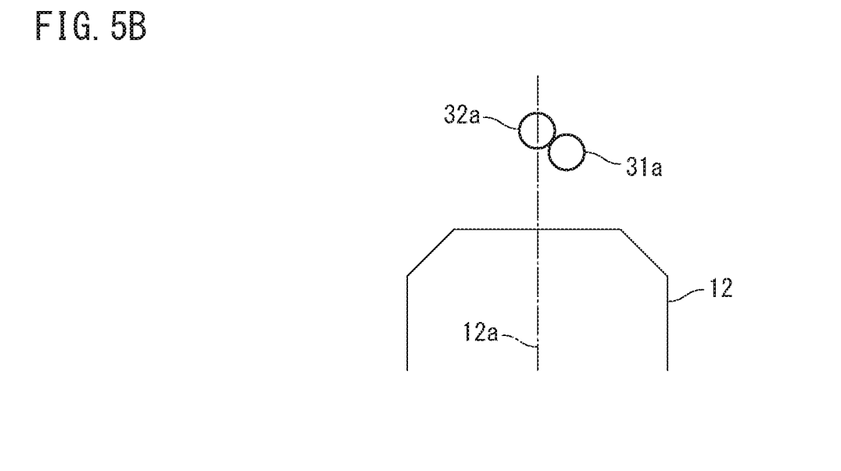

FIGS. 5A and 5B are diagrams showing a positional relationship between the supply port and the recovery port when viewed from the direction perpendicular to the optical axis of the objective lens. In FIG. 5A, the distal end of the supply port 31a and the distal end of the recovery port 32a are both linearly installed along the optical axis 12a direction so as to be adjacent to each other. The positional relationship between the supply port 31a and the recovery port 32a is not limited to the arrangement shown in FIG. 5A and may have the arrangement shown in FIG. 5B or FIGS. 6A and 6B. In FIG. 5B, only the recovery port 32a is positioned on the optical axis 12a, and the supply port 31a is positioned at a position off the optical axis 12a.

Figure 6A:
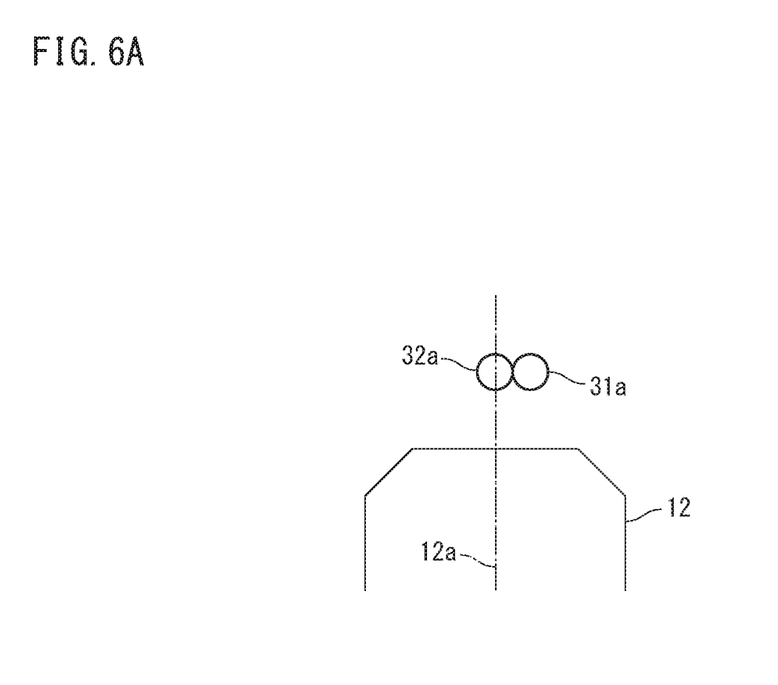
FIGS. 6A and 6B are diagrams showing an example of a positional relationship between the supply port, the recovery port, and the objective lens.
Figure 6B:
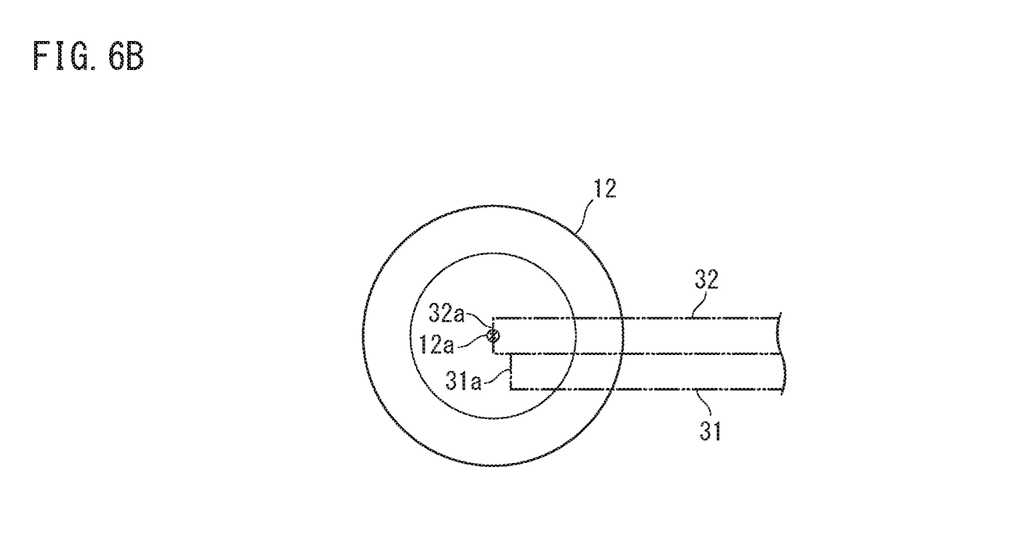

FIGS. 6A and 6B are diagrams showing a positional relationship between the supply port and the recovery port. FIG. 6A is a diagram viewed from the direction perpendicular to the optical axis of the objective lens, and FIG. 6B is a diagram viewed from the optical axis direction of the objective lens. In FIGS. 6A and 6B, the supply port 31a and the recovery port 32a satisfy the condition where the positions thereof with respect to the optical axis 12a differ from each other in the direction perpendicular to the optical axis 12a of the objective lens 12. At least a part of the recovery port 32a is arranged at a position different from that of the supply port 31a in the direction perpendicular to the optical axis 12a of the objective lens 12.

In FIG. 6A, the recovery port 32a is positioned on the optical axis 12, and the supply port 31a is positioned at a position off the optical axis 12a. Here, the supply port 31a and the recovery port 32a are arranged at the same position (the same height from the objective lens 12) in the optical axis direction. As shown in FIG. 6B, the positions of the supply port 31a and the recovery port 32a are shifted from each other in the direction perpendicular to the direction of the optical axis 12a and in the longitudinal direction of the supply member 31 and the recovery member 32.

In FIGS. 5A, 5B, 6A and 6B, the supply port 31a and the recovery port 32a are positioned while being in contact with each other. In such a case, space saving can be achieved. The supply port 31a and the recovery port 32a may be positioned with an interval therebetween. This clearance is determined in consideration of, for example, the working distance or the clearance between the objective lens 12 and the stage 3.

Figure 7A:
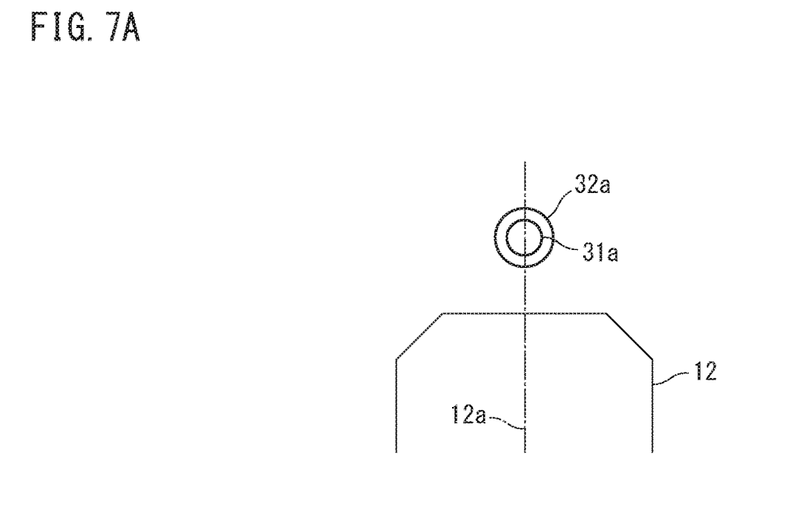
FIGS. 7A to 7C are diagrams showing an example of a positional relationship between the supply port, the recovery port, and the objective lens.
Figure 7B:
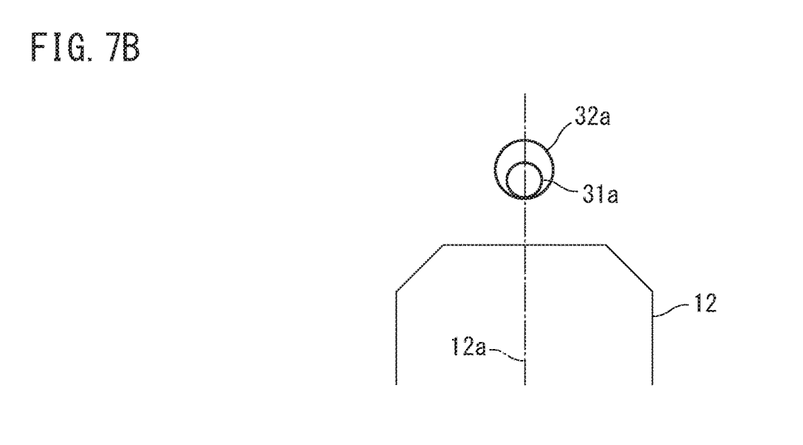
Figure 7C:
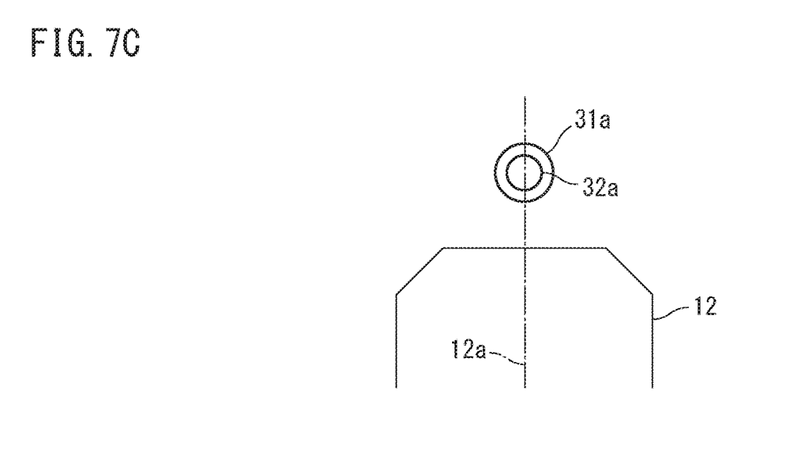

FIGS. 7A to 7C are diagrams showing a positional relationship between the supply port and the recovery port when viewed from the direction perpendicular to the optical axis of the objective lens. In FIG. 7A, the supply port 31a is arranged on the inner side of the recovery port 32a. That is to say, the supply member 31 shown in FIGS. 2A and 2B is inserted into the recovery member 32. The supply member 31 is arranged so that the outer circumference thereof covers the inner circumference of the recovery member 32. In this arrangement, a part of the recovery port 32a is arranged at a position farther from the distal end of the objective lens 12 than the supply port 31a in the optical axis direction of the objective lens 12. This considers the shape of the liquid formed on the objective lens 12 when the liquid is supplied onto the objective lens 12, so that the liquid is supplied so as to maintain the hemispherical shape thereof on the objective lens 12. Therefore, the amount of liquid supplied onto the objective lens 12 can be controlled by adopting the positional relationship in which the recovery port 32a is placed above the apex of the hemispherical shape.

In FIG. 7B, the supply port 31a is eccentrically arranged closer to the objective lens 12 than the center of the recovery port 32a. In such a case, the ratio of the region occupied by the supply port 31a in the lower region of the recovery port 32a is higher than that in FIG. 7A. In such a case, the supply region of the supply port 31a and the recovery region of the recovery port 32a are differentiated more clearly in terms of their functions in the optical axis direction. In FIG. 7A and FIG. 7B, the supply port 31a and the recovery port 32a are positioned on a straight line in the optical axis direction of the objective lens 12. However, the present invention is not limited to this, and either one thereof may be positioned off the optical axis. As shown in FIG. 7C, the recovery port 32a may be arranged on the inner side of the supply port 31a.

In the above embodiment, the objective lens 12 and the observation object (the specimen S) can relatively move in the direction of the optical axis 12a of the objective lens 12, and the inserter/remover 22 moves the supply member 31 and the recovery member 32 in conjunction with the relative movement between the objective lens 12 and the observation object. Therefore, for example, the need for complex control is eliminated when moving the supply member 31 and the recovery member 32, and interference (collision) between the supply member 31 and the recovery member 32, and other members can be avoided. In the above embodiment, the inserter/remover 22 moves the supply member 31 and the recovery member 32 with use of driving force which causes the relative movement between the objective lens 12 and the observation object, and therefore, the need for an actuator for supplying driving force to move the supply member 31 and the recovery member 32 can be omitted.

The inserter/remover 22 may move the supply member 31 and the recovery member 32 independent of the relative movement between the objective lens 12 and the observation object. The inserter/remover 22 may move the supply member 31 and the recovery member 32 by means of an actuator or the like, rather than using driving force which causes the relative movement between the objective lens 12 and the observation object.

In the above embodiment, The liquid supplier 8 includes the nozzle unit 21 which includes the supply member 31 and a recovery member 32, and the inserter/remover 22 rotates the nozzle unit 21 about the axis intersecting with the optical axis 12a of the objective lens 12, in conjunction with relative movement between the objective lens 12 and the observation object. Therefore, the inserter/remover 22 can efficiently insert or remove the supply member 31 and the recovery member 32 in the light path LP on the objective lens 12 while simplifying the configuration. The inserter/remover 22 may move the supply member 31 and the recovery member 32 independent of each other. The inserter/remover 22 may rotate at least one of the supply member 31 and the recovery member 32 about an axis parallel to the optical axis 12a or may move it within a plane intersecting with the optical axis 12a.

In the above embodiment, the inserter/remover 22 includes: the cam 23 provided on one of the stage 3 which supports the observation object (the specimen S) and the supporter which supports the objective lens 12; and the cam follower 24 provided on the other of the stage 3 and the supporter and engaged with the cam 23.

Therefore, the inserter/remover 22 can move the supply member 31 and the recovery member 32 in conjunction with the movement of the objective lens 12. The cam 23 may be provided on the stage 3, and the cam follower 24 may be provided on the supporter which supports the objective lens 12. The inserter/remover 22 may be of a configuration other than those using the cam 23 and the cam follower 24.

In the above embodiment, the liquid supplier 8 includes: the feeder 36 which is connected to the supply port 31a and feeds the liquid; and the sucker 37 which is connected to the recovery port 32a, and the sucker 37 performs suction in parallel at least with part of feeding performed by the feeder 36. Therefore, it is possible to reduce the length of time taken from the moment of starting liquid feeding to the moment of ending liquid suction and simplify the control of the feeder 36 and the sucker 37. The sucker 37 may start suction after the feeding performed by the feeder 36 is completed.

Second Embodiment

Figure 8A:
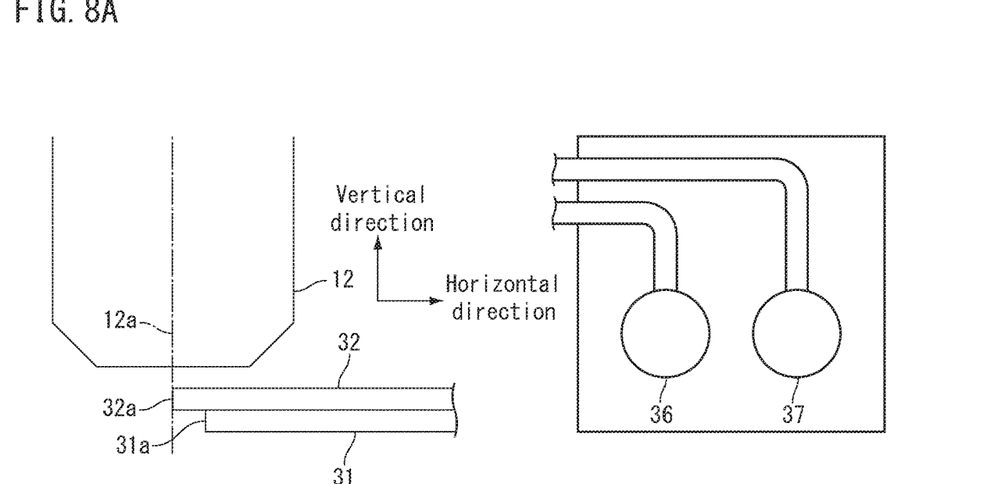
FIGS. 8A to 8C are diagrams showing a liquid supplier according to a second embodiment and an operation thereof.
Figure 8B:
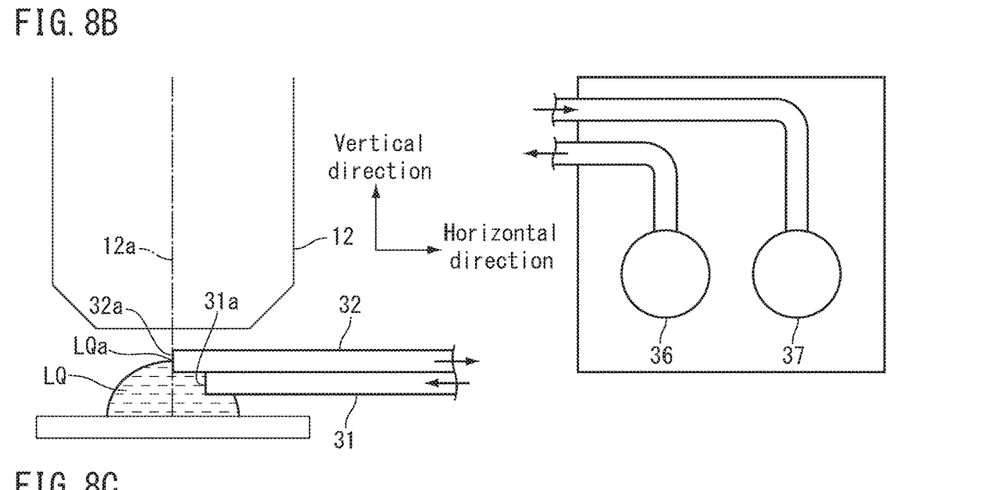
Figure 8C:
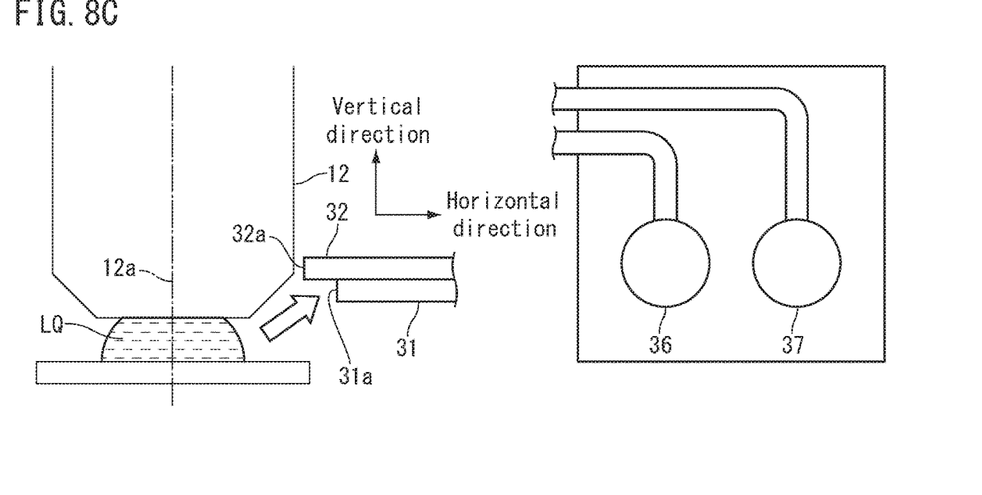

Hereunder, a second embodiment is described. In the present embodiment, similar members as those described above are assigned with the same symbols and the descriptions thereof are omitted or simplified. FIGS. 8A to 8C are diagrams showing a liquid supplier according to the present embodiment and an operation thereof. A microscope according to the present embodiment is an upright microscope. The objective lens 12 is arranged above the sample S. As shown in FIG. 8A, the recovery port 32a (the recovery member 32) is arranged above the supply port 31a (the supply member 31) as with the case of the inverted microscope. This is because while there is a difference therebetween, that is, whether the member on which the liquid formed when supplying and recovering the liquid is placed is on the objective lens 12 or on the specimen holder 9 (see FIG. 1), the shape of the supplied liquid is hemispherical in either case. The supply member 31 and the recovery member 32 are positioned with respect to the objective lens 12 in the state where supply of the liquid from the liquid feeder 36 (the supply pump) is stopped.

Next, as shown in FIG. 8B, the feeder 36 starts supplying the liquid, and the sucker 37 performs suction in parallel at least with a part of the feeding operation performed by the feeder 36. As a result, the liquid LQ is accumulated in a form of a droplet on the specimen holder 9 (see FIG. 1), and the height of the liquid level LQa increases as the total amount of the supplied liquid increases. When the upper end of the liquid level LQa reaches the height of the recovery port 32a, the liquid LQ is recovered at the position of the recovery port 32a, and the height of the liquid level LQa is maintained substantially constant. Thereby, a predetermined amount of the liquid LQ is held on the specimen holder 9.

After the liquid LQ on the objective lens 12 reaches the predetermined amount, the supply of the liquid LQ performed by the feeder 36 is stopped and the suction performed by the sucker 37 is stopped as shown in FIG. 8B. Next, the supply member 31 and the recovery member 32 are retracted from the light path LP above the specimen holder 9 (below the objective lens 12).

Modified Example

Figure 9A:
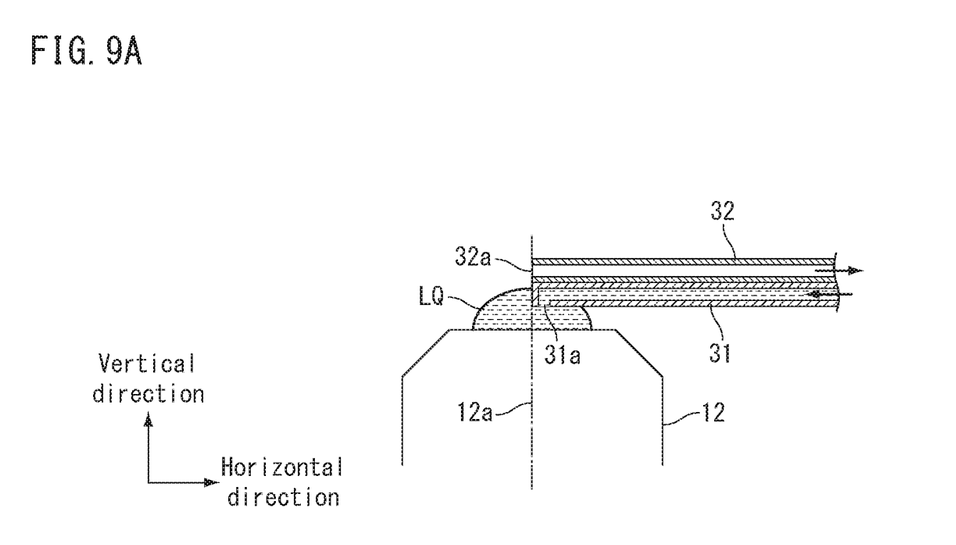
FIGS. 9A to 9C are diagrams showing a supply member and a recovery member according to a modified example.
Figure 9B:
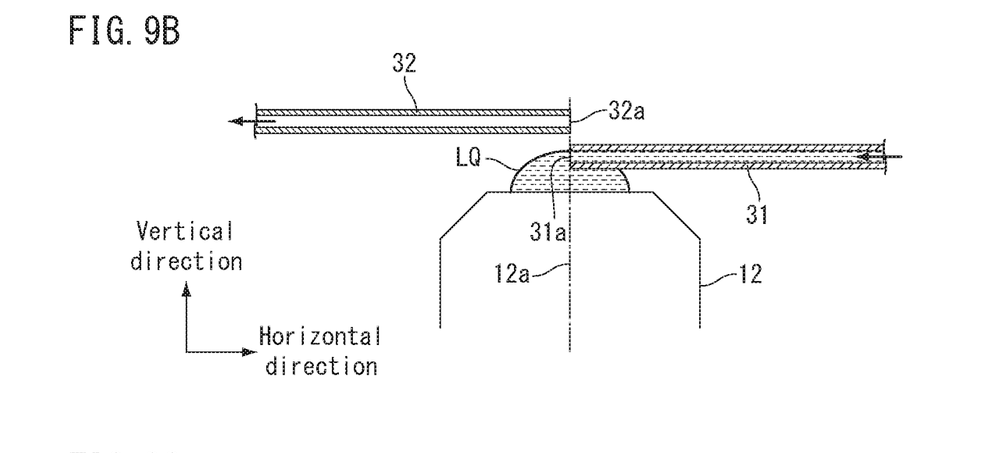
Figure 9C:
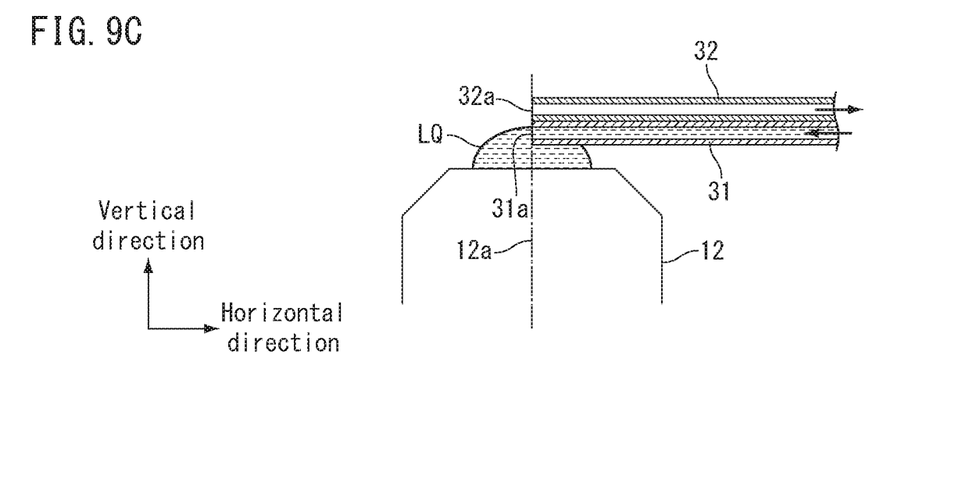

FIGS. 9A to 9C are diagrams showing a supply member and a recovery member according to a modified example. The supply member 31 and the recovery member 32 of a first modified example shown in FIG. 9A are such that the positions of the end part (the distal end) thereof on the side of the optical axis 12a of the objective lens 12 are substantially the same. The supply port 31a opens downward, and the recovery port 32a opens laterally. When the opening direction is different between the supply port 31*a* and the recovery port 32*a* in this manner, the liquid LQ supplied from the supply port 31*a* is suppressed from being directly recovered (sucked) from the recovery port 32*a*.

The supply member 31 and the recovery member 32 of a second modified example shown in FIG. 9B extend from different directions toward the optical axis 12*a* of the objective lens 12. For example, the supply member 31 and the recovery member 32 are arranged so as to face each other, and the position of the supply port 31*a* and the position of the recovery port 32*a* are substantially the same in the horizontal direction. In the horizontal direction, the position of the supply port 31*a* and the position of the recovery port 32*a* are substantially the same as that of the optical axis 12*a* of the objective lens 12, respectively.

The supply member 31 and the recovery member 32 of a third modified example shown in FIG. 9C extend from the same direction toward the optical axis 12*a* of the objective lens 12. For example, the position of the supply port 31*a* and the position of the recovery port 32*a* are substantially the same in the horizontal direction. In the horizontal direction, the position of the supply port 31*a* and the position of the recovery port 32*a* are substantially the same as that of the optical axis 12*a* of the objective lens 12, respectively. When such a supply member 31 and a recovery member 32 are used, the liquid LQ supplied from the supply port 31*a* may be suppressed from being recovered directly from the recovery port 32*a* by delaying the recovery start timing from the supply start timing.

The liquid LQ supplied from the supply port 31*a* may be suppressed from being recovered directly from the recovery port 32*a* by adjusting the liquid repellency of the recovery port 32*a* with respect to the liquid repellency of the supply port 31*a*. For example, the liquid repellency of the recovery port 32*a* may be set higher than the liquid repellency of the supply port 31*a*. A part of the liquid LQ supplied from the supply port 31*a* may be recovered directly from the recovery port 32*a*.

The technical scope of the present invention is not limited to the modes described in the above embodiment and so forth. One or more of the requirements described in the above embodiments and so forth may be omitted. One or more of the requirements described in the above embodiments and so forth may also be combined where appropriate. Furthermore, the contents of all documents cited in the detailed description of the present invention are incorporated herein by reference to the extent permitted by law.

In the above embodiment, the microscope 1 uses transillumination, but may use epi-illumination. In such a case, the image of the specimen S can be observed, using the light reflected and scattered by the specimen S or the fluorescence from the fluorescent substance contained in the specimen S.

The liquid supplier according to the embodiment can automatically control supply and recovery of the liquid onto and from the objective lens and is capable of automating each operation from the start to the end of a time-lapse observation in a liquid immersion observation.

Examples of the automatic control includes executing the recovery and supply operations at a predetermined timing when the liquid supplied to the objective lens in a time-laps observation is to be replaced. The liquid recovery and supply operations are preferably performed at a timing closer to the time of performing observation. In such a case, it is important to consider the length of time required for liquid recovery and supply so that the liquid recovery and supply operations do not overlap with the timing of performing the observation. The liquid recovery and supply operations include: an operation of increasing the clearance between the objective lens and the stage, an operation of recovering and supplying the liquid, and an operation of restoring the clearance between the objective lens and the stage after replacement of the liquid is completed.

The captured image may be automatically analyzed to determine the need for replacing the liquid. This determination can be made by automatically analyzing the brightness, contrast, focal deviation, and so forth of the captured image. Examples of this image include an image of a cell itself as an observation object and an image of a culture medium in which no cell is present. By preliminarily acquiring image information of the cells and the culture medium in the stage prior to the start of a time-lapse observation, and comparing the observation image against the acquired image serving as basic information after the time-lapse observation has started, it is possible to determine, from the comparison information, changes in the state of the liquid. In such a case, it is preferable to make a comparison on the basis of, for example, an image of a culture medium, excluding images of living cells which are an observation object expected to exhibit changes. When using image information of living cells, characteristics of an image which can be assumed not to occur in a normal culture process may be used as a basis of comparison. For example, an acute change in brightness of the entire image, an acute focal deviation in the outline of a cell, or the like may be detected. By determining whether or not the liquid needs replacing on the basis of an image observed during a time-lapse observation as described above, it is possible to realize more economical replacement of the liquid.

As described above, an observation image captured at an observation timing during a time-lapse observation may be used in the image acquisition for determining whether or not the liquid needs replacing, or an image for determining the need for liquid replacement may be acquired prior to the observation timing, and this image may be used to perform determination. In the case of performing determination with use of an observation image acquired at the observation timing, if liquid replacement is determined as necessary, it is also effective to re-acquire the observation image after executing the liquid recovery and supply. When employing a step of re-acquiring the observation image, a predetermined time-lapse observation schedule may be automatically changed.

In the case of a time-lapse observation of living cells, the process of changes occurring in the cells is observed, but the changes in the state are not constant and vary greatly depending on the culture period of the cells. Therefore, the liquid may be replaced around the timing at which changes in the state of the cells are significant. If the period during which changes in the state of cells are significant is known in advance, it is effective to replace the liquid during this period and not to replace the liquid at other times, or to increase the liquid replacement interval.

DESCRIPTION OF REFERENCE SIGNS

1 Microscope
7 Revolver
8 Liquid supplier
Objective lens
12*a* Optical axis
21 Nozzle unit
22 Inserter/remover
23 Cam
24 Cam follower 31 Supply member
31a Supply port
32 Recovery member
32a Recovery port
36 Feeder
37 Sucker
S Specimen
LP Light path
LQ Liquid

What is claimed is:

1. A liquid supplier comprising:
a supply port which supplies a liquid onto an objective lens arranged below an observation object; and
a recovery port which recovers the liquid supplied on the objective lens, wherein:
the supply port (i) is moved, in conjunction with downward movement of the objective lens, to a position above the objective lens in a direction of an optical axis of the objective lens and (ii) supplies the liquid at the position;
the recovery port is moved, in conjunction with the downward movement of the objective lens, to a position that is above the objective lens in the optical axis direction and is also above the supply port;
the liquid is collected at the position of the recovery port;
a height of the liquid on the objective lens is defined at the position at which the recovery port is located; and
the supply port and the recovery port are retracted from their positions above the objective lens in conjunction with upward movement of the objective lens.

2. The liquid supplier according to claim 1, wherein
a distance from the recovery port to the optical axis of the objective lens is shorter than a distance from the supply port to the optical axis when the recovery port is at the position above the objective lens.

3. The liquid supplier according to claim 1, the liquid supplier further comprising:
a supply member having the supply port;
a recovery member having the recovery port; and
an inserter/remover which inserts or removes the supply member and the recovery member.

4. The liquid supplier according to claim 3, the liquid supplier further comprising
a nozzle unit including the supply member and the recovery member, wherein
the inserter/remover rotates the nozzle unit about an axis intersecting with the optical axis of the objective lens, in conjunction with relative movement between the objective lens and the observation object.

5. The liquid supplier according to claim 3, wherein
the inserter/remover includes:
a cam provided on one of a stage which supports the observation object and a supporter which supports the objective lens; and
a cam follower provided on the other of the stage and the supporter and engaged with the cam.

6. The liquid supplier according to claim 1, the liquid supplier further comprising:
a feeder which is connected to the supply port and feeds the liquid; and
a sucker which is connected to the recovery port and sucks the liquid, wherein
the sucker performs suction in parallel at least with part of feeding performed by the feeder.

7. An objective lens holder which includes
the liquid supplier according to claim 1, and which holds and positions the objective lens.

8. A microscope comprising
the objective lens holder according to claim 7, and
the objective lens.

9. A liquid supply method comprising:
supplying a liquid from a supply port onto an objective lens arranged below an observation object, the supply port (i) being moved, in conjunction with downward movement of the objective lens, to a position above the objective lens in a direction of an optical axis of the objective lens and (ii) supplying the liquid at the position;
recovering from a recovery port the liquid supplied on the objective lens, the recovery port being moved, in conjunction with the downward movement of the objective lens, to a position that is above the objective lens in the optical axis direction and is also above the supply port; and
retracting the supply port and the recovery port from their positions above the objective lens in conjunction with upward movement of the objective lens, wherein
the liquid is collected at the position of the recovery port, and
a height of the liquid on the objective lens is defined at the position at which the recovery port is located.

10. A microscope comprising:
an objective lens;
a supply member including a supply port which supplies a liquid onto the objective lens arranged below an observation object; and
a recovery member including a recovery port which recovers the liquid on the objective lens, wherein:
the supply port (i) is moved, in conjunction with downward movement of the objective lens, to a position above the objective lens in a direction of an optical axis of the objective lens and (ii) supplies the liquid at the position;
the recovery port is moved, in conjunction with the downward movement of the objective lens, to a position that is above the objective lens in the optical axis direction and is also above the supply port;
the liquid is collected at the position of the recovery port;
a height of the liquid on the objective lens is defined at the position at which the recovery port is located; and
the supply port and the recovery port are retracted from their positions above the objective lens in conjunction with upward movement of the objective lens.

11. The microscope according to claim 10, wherein
a distance from the recovery port to the optical axis of the objective lens is shorter than a distance from the supply port to the optical axis when the recovery port is at the position above the objective lens.

12. The microscope according to claim 10, the microscope further comprising
an inserter/remover which moves the supply member and the recovery member.

13. The microscope according to claim 12, wherein
the inserter/remover moves the supply member and the recovery member so as to approach the objective lens.

14. The microscope according to claim 12, wherein
the inserter/remover moves the supply member and the recovery member so as to move away from the objective lens.

15. The microscope according to claim 12, wherein
the inserter/remover moves the supply member and the recovery member on the basis of a distance between the objective lens and the observation object.

16. The microscope according to claim 12, the microscope further comprising
   a nozzle unit including the supply member and the recovery member, wherein
   the inserter/remover rotates the nozzle unit about an axis intersecting with the optical axis of the objective lens, in conjunction with relative movement between the objective lens and the observation object.

17. The microscope according to claim 12, wherein
   the inserter/remover includes:
   a cam provided on one of a stage which supports the observation object and a supporter which supports the objective lens; and
   a cam follower provided on the other of the stage and the supporter and engaged with the cam.

18. The microscope according to claim 12, wherein
   supply and recovery of the liquid to and from the objective lens and the observation object are performed concurrently.

* * * * *